(12) United States Patent
Zhao et al.

(10) Patent No.: US 9,875,231 B2
(45) Date of Patent: Jan. 23, 2018

(54) APPARATUS AND METHOD FOR RESOLVING ZERO ANAPHORA IN CHINESE LANGUAGE AND MODEL TRAINING METHOD

(71) Applicant: Sony Corporation, Tokyo (JP)

(72) Inventors: Zhiwei Zhao, Beijing (CN); Kenichiro Kobayashi, Tokyo (JP); Youzheng Wu, Beijing (CN); Keisuke Yamaoka, Beijing (CN); Yu Zhang, Heilongjiang (CN); Qingyu Yin, Heilongjiang (CN); Weinan Zhang, Heilongjiang (CN); Ting Liu, Heilongjiang (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/054,471

(22) Filed: Feb. 26, 2016

(65) Prior Publication Data

US 2016/0253309 A1    Sep. 1, 2016

(30) Foreign Application Priority Data

Feb. 26, 2015 (CN) .......................... 2015 1 0088829

(51) Int. Cl.
*G06F 17/27* (2006.01)
*G06F 17/28* (2006.01)

(52) U.S. Cl.
CPC ........ *G06F 17/271* (2013.01); *G06F 17/2863* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2795
USPC .................................................. 704/1, 9, 10
See application file for complete search history.

(56) References Cited

U.S. PATENT DOCUMENTS

| | | | |
|---|---|---|---|
| 5,774,845 A * | 6/1998 | Ando | G06F 17/271 |
| | | | 704/231 |
| 9,141,601 B2 * | 9/2015 | Hamada | G06F 17/2755 |
| 2001/0029455 A1 * | 10/2001 | Chin | G06F 17/273 |
| | | | 704/277 |

(Continued)

OTHER PUBLICATIONS

Liang et al., Chinese Pronominal Anaphora Resolution Using Lexical Knowledge and Entropy-Based Weight, 2008, vol. 59 No. 13, pp. 2138-2145.*

(Continued)

*Primary Examiner* — Lamont Spooner
(74) *Attorney, Agent, or Firm* — Oblon, McClelland, Maier & Neustadt, L.L.P.

(57) ABSTRACT

The present disclosure provides an apparatus and method for resolving zero anaphora in Chinese language and a training method. The apparatus includes: a feature vector extracting unit, configured to extract, from an input text, feature vectors which are respectively based on candidate positions of zero pronouns, and a word pair of candidate zero pronoun category and candidate noun for each position of the candidate zero pronouns; and a classifier, configured to input the feature vectors into a joint model, so as to determine the zero pronouns in the text.

10 Claims, 4 Drawing Sheets

(56) References Cited

U.S. PATENT DOCUMENTS

| | | | | |
|---|---|---|---|---|
| 2003/0083859 | A1* | 5/2003 | Murata | G06F 17/27 704/1 |
| 2005/0273314 | A1* | 12/2005 | Chang | G06F 17/2705 704/4 |
| 2006/0206307 | A1* | 9/2006 | Sugihara | G06F 17/279 704/4 |
| 2006/0282414 | A1* | 12/2006 | Sugihara | G06F 17/30654 |
| 2010/0063795 | A1* | 3/2010 | Sakao | G06F 17/30616 704/9 |
| 2011/0131033 | A1* | 6/2011 | Ylonen | G06F 17/27 704/9 |
| 2012/0183935 | A1* | 7/2012 | Hamada | G06F 17/2755 434/167 |
| 2012/0304055 | A1* | 11/2012 | Nakazawa | G06F 17/30699 715/255 |
| 2013/0185049 | A1 | 7/2013 | Zhao et al. | |
| 2014/0052728 | A1* | 2/2014 | Nakazawa | G06F 17/30598 707/737 |
| 2015/0032444 | A1* | 1/2015 | Hamada | G06F 17/2715 704/9 |

OTHER PUBLICATIONS

Hai-Dong Wang et al. "Tree Kernel Function-based Pronoun Coreference Resolution", Computer Engineering, Aug. 2009, 3 pages ( with English Abstract).

Ching-Long Yeh et al. "Zero Anaphora Resolution in Chinese with Shallow Parsing", Journal of Chinese Language and Computing, 17, 15 pages, 2003.

Hu Naiquan "Research on Feature Vectors based Chinese Coreference Resolution and It's Implementation", Feature vector based Chinese Coreference Resolution Research and System Implementation, 2009, 71 pages ( with English Abstract).

Kong Fang et al. "Anaphoricity Determination for Coreference Resolution in English and Chinese Languages", Journal of Computer Research and Development, 2012, 14 pages ( with English Abstract).

Yan-cui Li et al. "Anaphora Resolution of Noun Phrase Based on SVM", Computer Engineering, 2009, 3 pages ( with English Abstract).

* cited by examiner

| Method | Precision (%) | Recall ratio (%) | F1 score (%) |
|---|---|---|---|
| Traditional Pipeline Method | 75.4 | 8.7 | 15.6 |
| Joint Model Method | 84.1 | 19.6 | 31.8 |

APPARATUS AND METHOD FOR RESOLVING ZERO ANAPHORA IN CHINESE LANGUAGE AND MODEL TRAINING METHOD

FIELD OF THE INVENTION

The embodiments of the present invention generally relate to the field of information processing, particularly relate to the natural language processing. More particularly, they relate to an apparatus and a method for resolving zero anaphora in Chinese language and a corresponding method for training model.

BACKGROUND OF THE INVENTION

Ellipsis is a common phenomenon in Chinese dialogue. With these ellipses, it is difficult for a computer to automatically understand sentences. For example, the zero anaphora is a combination of two language phenomena of zero pronouns and pronoun referent, which are normal language phenomena in Chinese language.

Zero pronouns means that the pronouns appeared previously are often omitted in the latter of the text in Chinese language. For example, in the following exemplary sentence "俄 罗斯作为米洛 舍维奇 贝的 支持者, ＊它＊曾经提出调停这场政治危机", "＊它＊" is one zero pronoun in the text, which is omitted and not present in the text.

Pronominal anaphora means that the object appeared previously is often replaced with a pronoun in Chinese text. For example, in the following exemplary sentence "李明怕高妈妈一人呆在家里寂寞, 他便将家里的电视搬了过来", "他" actually refers to "李明".

The resolving for zero anaphora includes two aspects, that is, the zero pronouns restoration and the resolving of pronoun resolution. The zero pronouns restoration is to find out the pronouns which are omitted in the text, and add the restored pronouns back to the sentence. The pronoun resolution is to find out, with respect to the sentence which has restored the pronouns, the object referred specifically by each pronoun.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, there is provided an apparatus for resolving zero anaphora in Chinese language. The apparatus includes: a feature vector extracting unit, configured to extract, from an input text, feature vectors which are respectively based on candidate positions of zero pronouns, and a word pair of candidate zero pronoun category and candidate noun for each candidate position of the zero pronouns; and a classifier, configured to input the feature vectors into a joint model, so as to determine the zero pronouns in the text.

According to another aspect of the present application, there is provided a method for resolving zero anaphora in Chinese language. The method includes: extracting, from an input text, feature vectors which are respectively based on candidate positions of zero pronouns, and a word pair of candidate zero pronoun category and candidate noun for each candidate position of the zero pronouns; and inputting the feature vectors into a joint model to perform classifying, so as to determine the zero pronouns in the text.

According to still another aspect of the present invention, there is provided a method for training a joint model for resolving zero anaphora in Chinese language, including: inputting a set of training texts which are labeled with information of zero pronouns and antecedents of the zero pronouns; acquiring in each text in the set of training texts, based on the labeling, candidate positions of zero pronouns, zero pronoun categories, as well as word pairs of candidate zero pronoun category and candidate noun; acquiring feature vectors of the candidate positions of the zero pronouns, and feature vectors of the word pairs of candidate zero pronoun category and candidate noun; and training the joint model based on the feature vectors and the labeled information.

According to other aspects of the present invention, there are further provided computer program codes and computer program product for implementing the method mentioned above for resolving zero anaphora in Chinese language, as well as a computer readable storage medium on which computer program codes for realizing the aforementioned method for resolving zero anaphora in Chinese language are recorded.

The apparatus and method as well as the training method according to the present invention translate the zero anaphora resolution to a problem of joint optimized solution of zero pronoun category-pronoun resolution by adopting the joint model, effectively preventing the accumulation of error and improving the performance of resolving the zero anaphora.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

As stated above, in the specification, the zero pronouns refer to the pronouns which are omitted in the text for the purpose of causing the language to be concise or meet the language habits. The resolving for zero anaphora refers to the following procedure: finding out the omitted zero pronouns (zero pronoun restoration) in the text, and finding out the noun which is actually referred to by the pronoun (pronoun resolution).

If the two steps of the zero pronoun restoration and the pronoun resolution are performed in a manner of pipeline in sequence, the restoration error of the zero pronoun restoration may lead to further deviation of the result of the pronoun resolution, and thus the performance is poor. However, in the present application, a joint model is adopted to optimize the above mentioned two problems simultaneously, and thus the accumulation of error is avoided.

Figure 1:
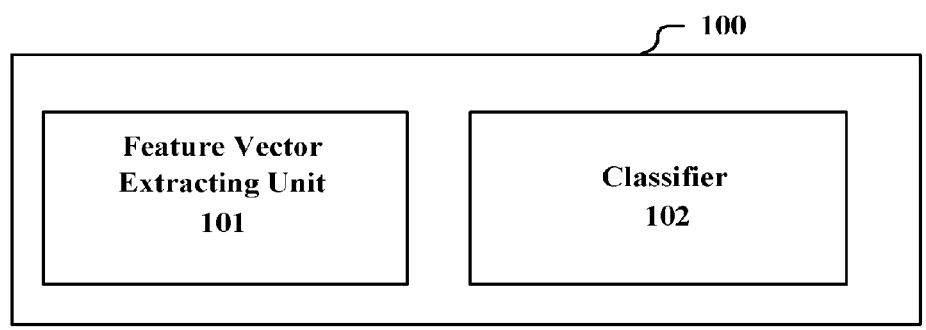
FIG. 1 is a structural block diagram of the apparatus for resolving zero anaphora in Chinese language according to an embodiment of the present application.

As shown in FIG. 1, the apparatus 100 for resolving zero anaphora in Chinese language according to an embodiment of the present application includes: a feature vector extracting unit 101, configured to extract, from an input text, feature vectors which are respectively based on candidate positions of zero pronouns, and a word pair of candidate zero pronoun category and candidate noun for each candidate position of the zero pronouns; and a classifier 102, configured to input the feature vectors into a joint model, so as to determine the zero pronouns in the text.

For example, operations such as word segmentation, part of speech tagging, named entity recognition and dependency parsing have been performed on the input text. Wherein, the dependency parsing refers to parsing one sentence into such a tree structure: the dominant verb of the sentence is at a central position to dominate the other words; the other words depend on a certain word directly or indirectly; none of the words depend on two or more than two other words simultaneously. The named entity recognition refers to the recognition of the word representing of an entity in real life from among the text. Since these operations are not in close relation to the substance of the present invention, and can be performed with prior art, they are not described in detail here.

With respect to the input text, the feature vector extracting unit 101 first acquires the candidate positions of zero pronouns, which are positions where may exist the zero pronouns. For example, the left side of each word in the sentence is taken as the candidate position of the zero pronoun, and then the feature vector of the candidate position of the zero pronoun is extracted. In addition, with respect to each candidate position of the zero pronoun, there may be a certain suitable zero pronoun category, such as I, we, you (in singular form, 你), you (in plural form, 你们), he, them (plural form of "he", 他们), she, them (plural form of "she", 她们), it, them (plural form of "it" 它们), and so on. Further, there may also be no zero pronouns, i.e., NULL. With respect to each candidate zero pronoun category of the candidate position of zero pronoun, all of the nouns in N sentences (for example, N is 3) in the previous context of the position can be extracted, so as to form the word pair of candidate zero pronoun category and candidate noun. The feature vector extracting unit 101 extracts its feature vector. After acquiring the above mentioned feature vectors, the classifier 102 inputs them into the joint model, so as to judge on which candidate position of the zero pronoun there most probably be a zero pronoun and to which noun this zero pronoun most probably refers.

Assuming that the zero pronouns are denoted by p, p= $p_1, \ldots, p_n$, wherein, $p_i \in P$, $1 \leq i \leq n$, P is a set of the pronouns, for example a set including I, we, you, you (你们), he, them (他们), she, them (她们), it, them (它们), and NULL, then the classifier 102 solves the following problem:

$$(\hat{p}, \hat{r}) = \arg_{p,r} \max \text{Score}_{joint}(w, p, r) \qquad (1)$$

Wherein, $$\hat{p} = \arg_p \max \text{Score}_{dp}(w, p) \qquad (2)$$

$$\hat{r} = \arg_r \max \text{Score}_{resolution}(w, p, r) \qquad (3)$$

Wherein, w represents a word in the sentence, r represents the procedure of pronoun referent resolution, wherein, r={(n,p):n∈w,p∈p̂}, n represents the noun which is referred to by the restored zero pronoun p. p̂ and r̂ represent the optimized zero pronoun restoration and the optimized pronoun referent resolution respectively.

It can be seen that the apparatus 100 accomplishes the optimization of searching for zero pronoun category-pronoun resolution in a joint manner, and thus can effectively avoid the accumulation of the error, improving the performance of resolving the zero anaphora.

Wherein, the above mentioned joint model is acquired by training based on a set of training texts in advance, and the apparatus 100 loads the joint model for example when operating. Hereinafter, a specific example of the apparatus 100 will be given in combination with the training procedure of the model.

When training the joint model, a set of training texts which are labeled with information of zero pronouns and referent of the zero pronouns is input first. Similarly, the text in the set of texts may also be the text which has been subject to word segmentation, part of speech tagging, named entity recognition and dependency parsing. Moreover, it is acquired whether there is a zero pronoun on the left side of each word, and if there is such a zero pronoun, which refers to a noun, through manual annotation. For example, the information of such zero pronouns and antecedents of the zero pronouns together with the corresponding sentence can be stored in the same file, for example, by storing the sentence in a line, and storing the information of zero pronouns and antecedents of the zero pronouns in the subsequent line.

According to the information of zero pronouns and antecedents of the zero pronouns of the set of training texts, the candidate positions of the zero pronouns labeled with the zero pronoun categories can be obtained as the training instances. For example, the original sentence is assumed to be "'俄罗斯作为米洛舍维奇一贯的支持者, 曾经提出调停这场政治危机。"

"#" is used to denote the candidate position of the zero pronoun on the left side of each word, and the sentence is denoted as follows "#俄罗斯#作为#米洛舍维奇#一贯#的#支持者#, #曾经#提出#调停#场#这#政治#危机#。"

According to the above mentioned specifying manner of the candidate positions of the zero pronouns, the sentence will produce 15 candidate positions of zero pronouns. That is, there is 15 "#". The numbering is represented by the index of the word: ⓪ represents the candidate position of the zero pronoun on the left side of the 0-th word "俄罗斯", i.e., as the first #, and so on and so forth. According to the labeling information, the label for zero pronoun at the first # is 0, meaning that there is no zero pronoun. ⑦ represents the position of the candidate zero pronoun on the left side of the 7-th word "'曾经'", i.e., as the seventh #. According to the labeling information, the label for zero pronoun at this position is "它". Therefore, the sentence including the labeling information is denoted as "#俄罗斯#作为#米洛舍维奇#一贯#的#支持者#, *它*曾经#提出#调停#这#场#政治#危机#。". Wherein, the labeling information is that there is a zero pronoun "*它*" on the left of "曾经". "*" reveals that it is a zero pronoun, and this "*它*" refers to "俄罗斯".

Next, the feature vector of the candidate position of the zero pronoun is acquired. For example, the feature vector includes therein at least one of the following features: syntactic features, lexical features, structure features, pronoun specific features. These features can be obtained from the representation of the tree structure acquired by dependency parsing.

As an example, the syntactic features include: current node label, parent node label, preceding node label, grandparent node label, left-most sibling label, right-most sibling label, label of child node of preceding node, left sibling label, right sibling label, dependency relation of current word, and dependency relation of head word. The lexical features include: part of speech of current word, part of speech of preceding word, current word, preceding word, whether the current word is a verb, whether the current word is a transitive verb. The structure features include: word distance between current word and preceding word, normalized word distance between current word and preceding word, word distance between current word and the nearest verb, path from the current word to the preceding word, path from the current word to root node. The pronoun specific features include: the nearest pronoun appeared before the current word, the set of pronouns of last sentence.

Specifically, in one example, the feature vector of the candidate position of zero pronoun includes at least one of the following features: syntactic features of a current word corresponding to the candidate position of zero pronoun, syntactic features of a parent node of the current word in a dependency tree, syntactic features of a word preceding the current word, a distance between the current word and its parent node in the dependency tree, a number of verbs, not including the current word and its parent node, in a dependency sub-tree between the current word and its parent node in the dependency tree, a number of commas, not including the current word and its parent node, in a dependency sub-tree between the current word and its parent node in the dependency tree, feature of part of speech of a verb of a parent node of the current word in the dependency tree, a combination of part of speech of the current word and a dependency arc label of the current word with its parent node as well as the part of speech of the parent node of the current word and a dependency arc label of the parent node of the current word with a higher parent node, a combination of the part of speech of the current word and a path from the current word to a root node of the dependency tree.

For example, the following operations can be performed (still taking the above mentioned sentence as an example):

1) extracting the syntactic features of the current word, i.e., extracting the related features of the word corresponding to the numbering of the candidate position of the zero pronoun. The features include for example the word, the part of speech, the word of parent node in the dependency tree, as well as the dependency arc label of the current word with its parent node. Taking the candidate position ⑦ of the zero pronoun as an example, the current word is the 7-th word in the sentence "曾经" ("current word" in hereinafter is defined in the same way as here), the part of speech thereof is d (meaning that this word is an adverb), the word of parent node in the dependency tree is "'提出'", the dependency arc label is ADV (meaning that this word is an adverbial of the word of parent node in the dependency tree).

2) extracting the syntactic features of the parent node of the current word in the dependency tree, i.e., extracting the related features of the word corresponding to the parent node. The features include for example the word, the part of speech, the word of parent node in the dependency tree, as well as the dependency arc label of the parent node with its parent node. Still taking the current word corresponding to the candidate position ⑦ of the zero pronoun as an example, the word of the parent node is "提出", the part of speech of the parent node is v (verb), the word of the higher parent node of the parent node in the dependency tree is ROOT (root node), and the corresponding dependency arc label is HED.

3) extracting the syntactic features of the word preceding the current word, i.e., extracting the related features of the preceding word. The features include for example the word, the part of speech, the word of parent node in the dependency tree, as well as the dependency arc label of the preceding word with its parent node. Still taking the current word corresponding to the candidate position ⑦ of the zero pronoun as an example, its preceding word is ",", the part of speech is wp, the word of the parent node in the dependency tree is "作为", and the dependency arc label is WP.

4) extracting the distance between the current word and its parent node in the dependency tree. Still taking the current word corresponding to the candidate position ⑦ of the zero pronouns as an example, its position in the sentence is 7, and its parent node is in a position of 8 in the sentence, and thus the feature takes the value of 1.

5) extracting the number of verbs, not including the current word and its parent node, in a dependency sub-tree between the current word and its parent node in the dependency tree. Taking the current word corresponding to the candidate position ⑦ of the zero pronoun as an example, the dependency sub-tree between the current word and its dependency parent node is "'曾经 提出'" Since there is no verb, the feature takes the value of 0

6) extracting the number of commas, not including the current word and its parent node, in a dependency sub-tree between the current word and its parent node in the dependency tree. Taking the current word corresponding to the candidate position ⑦ of the zero pronoun as an example, the dependency sub-tree between the current word and its dependency parent node is "曾经 提出". Since there is no comma, the feature takes the value of 0.

7) extracting feature of part of speech of a verb of a parent node of the current word in the dependency tree. If the part of speech of the word of the parent node in the dependency tree is verb, this feature takes the value of 1, otherwise it takes the value of 0. Taking the current word corresponding to the candidate position ⑦ of the zero pronouns as an example, the part speech of the word of the parent node in the dependency tree is v, and thus the feature takes the value of 1.

8) extracting the part of speech of the current word and the dependency arc label of the current word with its parent node, as well as the part of speech of the parent node of the current word and a dependency arc label of the parent node of the current word with a higher parent node, and combining them. Taking the current word corresponding to the candidate position ⑦ of the zero pronoun as an example, the part of speech of the current word is d, the dependency arc label of the current word with its parent node is ADV, the part of speech of the parent node of the current word is v, and the dependency arc label of the parent node of the current word with a higher parent node is HED. "d ADV HED v" is obtained by combining them.

9) extracting the part of speech of the current word and a path from the current word to a root node of the dependency tree, and combining them. Taking the current word corresponding to the candidate position ⑦ of the zero pronouns as an example, the part of speech of the current word is d, the path from the current word to root node of the dependency tree is "ADV HED ROOT". "d ADV HED ROOT" is obtained by combining them.

After obtaining the feature vector as stated above, a multiple classification model is trained based on the feature vector and the corresponding zero pronoun categories. This model is used to judge the candidate position of zero pronoun-candidate zero pronoun category. For example, the model can be a maximum entropy model. The maximum entropy modeling tools can be used to acquire the multivariate classification model in training. When using the pre-stored multiple classification model in practical use, by inputting a feature vector, the restoration probability of its corresponding candidate zero pronoun categories can be acquired.

Next, based on the information of zero pronouns and referent of the zero pronouns labeled in the set of training texts, the word pairs of candidate zero pronoun category and candidate noun where there exists the referent relationship there between are obtained. Specifically, still taking the previous sentence as an example, there is a zero pronoun "*它*" on the left of "曾经", and there are three nouns in its preceding sentence "'俄罗斯'", "'支持者'" and "'米洛舍维奇'". Three word pairs of zero pronoun and candidate noun are obtained, which are respectively (*它*, 俄罗斯), (*它*, 支持者), and (*它*, 米洛舍维奇). Wherein, the label for a sample where there exists the referent relationship such as (*它*, 俄罗斯) is 1, while the label for a sample where there exists no referent relationship such as (*它*, 米洛舍 维奇) is 0.

With respect to each word pair of zero pronoun and candidate noun, its feature vector is obtained. This feature vector can include at least one of the following features: lexical features, syntactic features, bi-gram features, and pronoun specific features.

Specifically, for example, with respect to the word pair of zero pronoun and candidate noun (i, j), i being the pronoun and j being the noun, the lexical features include: word j, part of speech of i, part of speech of j, whether j being a named entity, the dependency relation of word j, the dependency relation of word i, the word preceding j, and the word preceding i. The syntactic features include: path from j to its preceding word, path from i to its preceding word, path from i to its root node word, path from j to its root node word, parent node of i, and parent node of j. The bi-gram features refer to the language mode score of the word pair. The pronoun specific features include: sex information of word i, number information of word j.

In one example, the feature vector based on the word pair of zero pronoun category and candidate noun includes at least one of the following features: syntactic features of a noun, syntactic features of a zero pronoun, part of speech of the noun and a dependency arc label of the noun with its parent node as well as part of speech of the parent node of the noun and a dependency arc label of the parent node of the noun with a higher parent node, part of speech of the noun and a path from the noun to a root node of the dependency tree, part of speech of the zero pronoun and a dependency arc label of the zero pronoun with its parent node as well as part of speech of the parent node of the zero pronoun and a dependency arc label of the parent node of the zero pronoun with a higher parent node, part of speech of the zero pronoun and a path from the zero pronoun to a root node of the dependency tree, a bi-gram probability of the noun and a word after the zero pronoun obtained by statistics on large scale texts.

For example, the following operations can be performed (stilling taking the above mentioned exemplary sentence as an example):

1) extracting the syntactic features of the noun, i.e., extracting the related features of the noun in the word pair of the zero pronoun and candidate noun, including the word, the part of speech, the named entity category, as well as the dependency arc label of the noun with its parent node in the dependency tree. Taking the word pair (*它*, 俄罗斯) as an example, the noun thereof is "俄罗斯", and thus the word is "俄罗斯", the part of speech is n (meaning that this word is a noun), the named entity category is ns (meaning that this word is a named entity in geography), and the dependency arc label is SBV (meaning that this noun is a subject of the word of its parent node in the dependency tree).

2) extracting the syntactic features of the zero pronoun, i.e., extracting the related features of the zero pronoun in the word pair of the zero pronoun and candidate noun, including the word, the part of speech, the named entity category, the dependency arc label of the zero pronoun with its parent node in the dependency tree, as well as sex and singular or plurality. Still taking the word pair (*它*, 俄罗斯) as an example, the zero pronoun thereof is "*它*", and thus the word is "它", the part of speech is r, the named entity category is o, the dependency arc label is ADV, the sex is None (meaning that this word represents no sexual information), the singular or plurality is single (meaning that this word is used to denote singular noun).

3) extracting the part of speech of the noun and the dependency arc label of the noun with its parent node, as well as the part of speech of the parent node of the noun and the dependency arc label of the parent node of the noun with a higher parent node, and combining them. Taking the word pair (*它*, 俄罗斯) as an example, the noun thereof is "俄罗斯", and thus the word is "俄罗斯", the part of speech is n, the dependency arc label of the noun with its parent node is SBV, the part of speech of the parent node of the noun is v, and the dependency arc label of the parent node of the noun with a higher parent node is HED. "d SBV HED v" is obtained by combining them.

4) extracting the part of speech of the noun and the path from the noun to the root node of the dependency tree, and combining them. Taking the word pair (*它*, 俄罗斯) as an example, the noun thereof is "俄罗斯", and thus the word is "俄罗斯", the part of speech is n, and the path from the noun to the root node of the dependency tree is "SBV HED ROOT". "n SBV HED ROOT" is obtained by combining them.

5) extracting the part of speech of the zero pronoun and a dependency arc label of the zero pronoun with its parent node, as well as part of speech of the parent node of the zero pronoun and the dependency arc label of the parent node of the zero pronoun with a higher parent node, and combing them. Taking the word pair (*它*, 俄罗斯) as an example, the zero pronoun thereof is "*它*", and thus the word is "它", the part of speech is r, the dependency arc label of the zero pronoun with its parent node is ADV, the part of speech of the parent node of the zero pronoun is v, and the dependency arc label of the parent node of the zero pronoun with the higher parent node is HED. "d ADV HED v" is obtained by combining them.

6) extracting the part of speech of the zero pronoun and the path from the zero pronoun to the root node of the dependency tree, and combining them. Taking the word pair (*它*, 俄罗斯) as an example, the zero pronoun thereof is "*它*", and thus the word is " ", the part of speech is r, and the path from the zero pronoun to the root node of the dependency tree is "ADV HED ROOT". "n ADV HED ROOT" is obtained by combining them.

7) extracting the bi-gram probability of the noun and the word after the zero pronoun obtained by statistics on large scale texts. Taking the word pair (*它*, 俄罗斯) as an example, the word after the zero pronoun "*它*" is "提出". Assuming that the probability for such a bi-gram as "俄罗斯 提出" appearing in a group of large scale texts is 0.00124, this feature takes the value of 0.00124.

After obtaining the feature vector as stated above, a binary classification model is trained based on the feature vector and the labeled information of whether there is the referent relationship. This model is used to judge whether there exists referent relationship between the zero pronoun and the candidate noun. For example, the model can be a maximum entropy model. The maximum entropy modeling tools can be used to acquire the binary classification model in training. When using the pre-stored binary classification model in practical use, by inputting a feature vector, the resolution probability that there exists the referent relationship between the zero pronouns and the candidate noun in this pair can be acquired.

Then, according to the information of zero pronouns and referent of the zero pronouns labeled in the set of training texts, and the obtained multivariate classification model and binary classification model in the above, triples of candidate position of zero pronouns-zero pronoun category-candidate nouns labeled with positive sample or negative sample are obtained. Specifically, with respect to all of the candidate positions of the zero pronouns labeled with zero pronouns in a sentence, the restoration probability of each candidate position of zero pronoun corresponding to each zero pronoun category is acquired using the obtained multivariate classification model; with respect to each candidate position of the zero pronoun labeled with zero pronouns in the sentence and each category of zero pronouns, the resolution probability of each zero pronoun category of each position being resolved as each candidate noun before the position is acquired using the obtained binary classification model; with respect to each triple of candidate position of zero pronoun-candidate zero pronoun category-candidate noun, the triples labeled in the set of training texts are considered as positive samples, and the other triples are considered as negative samples.

For example, in the above mentioned sentence "俄罗斯 作为 米洛舍维奇 一员 的 支持者, *它* 曾经 提出 调停 这 场 政治 危机 。", the labeled information is that there is an omitted "*它*" on the left of "曾经", and the "*它*" refers to "俄罗斯". The candidate position of the zero pronouns is ⑦. By using the above mentioned multivariate classification model, it is obtained that the probability of restoring ⑦ to be "*它*" is 0.254, the probability of restoring ⑦ to be "*他*" is 0.144, the probability of restoring ⑦ to be "*她*" is 0.106, the probability of restoring ⑦ to be "*我*" is 0.077, and so on.

With respect to the candidate of restoring the candidate position of the zero pronoun ⑦ to be "*它*", the resolution probability that there exists the referent relationship between (*它*, 俄罗斯) is 0.447, which is a positive sample. The resolution probability that there exists the referent relationship between (*它*, 米洛舍维奇) is 0.100, which is a negative sample. The resolution probability that there exists the referent relationship between (* *, 支持者) is 0.204, which is also a negative sample.

Using the above mentioned results acquired with respect to the set of training data, i.e., with respect to each triple, the restoration probability of its candidate position of zero pronoun and candidate zero pronoun category is regarded as a first dimensional feature, the resolution probability of the candidate zero pronoun category and candidate noun is regarded as a second dimensional feature, and the first dimensional feature and the second dimensional feature together with the label of positive or negative sample for this triple are inputted into another binary classification model (a second binary classification model) to perform training. The second binary classification model is used to judge the confidence level of the result of the zero anaphora resolution represented by the triple. For example, when using the model to perform judging in practical use, the obtained result denotes the probability that there is the candidate zero pronoun category at this candidate position of zero pronoun and that it is correct (positive sample) or wrong (negative sample) it refers to the candidate noun.

As an example, the second binary classification model can be a support vector machine model. The model can be obtained using modeling tools for support vector machine in training.

For example, in linear models, the triple (w, p, r) with the highest confidence level can be selected as follows.

$$Score_{joint}(w, p, r) = \alpha * Score_{dp}(w, p) + \beta * Score_{resolution}(w, p, r) \quad (4)$$

Wherein, $$Score_{dp}(w, p) = P(p | w) = \prod_{i=1}^{n} P(p_i | w) = \prod_{i=1}^{n} \frac{\exp(\Sigma_k \lambda_k f_k(w, p_i))}{Z(w)} \quad (5)$$

$$Score_{resolution}(w, p, r) = \quad (6)$$
$$P(r | w, p) = \prod_{i=1}^{n} P(r_i | w, p) = \prod_{i=1}^{m} \frac{\exp(\Sigma_k \lambda_k f_k(w, p, r_i))}{Z(w, p)}$$

Wherein, the parameters α and β can be obtained by automatic training. The equations (5) and (6) can be obtained based on the above mentioned restoration probability and resolution probability respectively. Wherein, w denotes a certain word in the sentence, $p_i$ is a predicted pronoun of the word w. In equation (5), $f_k(w,p_i)$ denotes the feature vector, and $Z(w) = \Sigma_{n \in p} \exp(\Sigma_k \lambda_k f_k(w,p))$ is a normalization factor. Similarly, $Z(w,p) = \Sigma_{r \in R} \exp(\Sigma_k \lambda_k f_k(w,p,r))$ in equation (6) is a normalization factor.

After obtaining the joint model by the above mentioned training procedure, the apparatus 100 can use the joint model to resolve zero anaphora on the input text.

Figure 2:
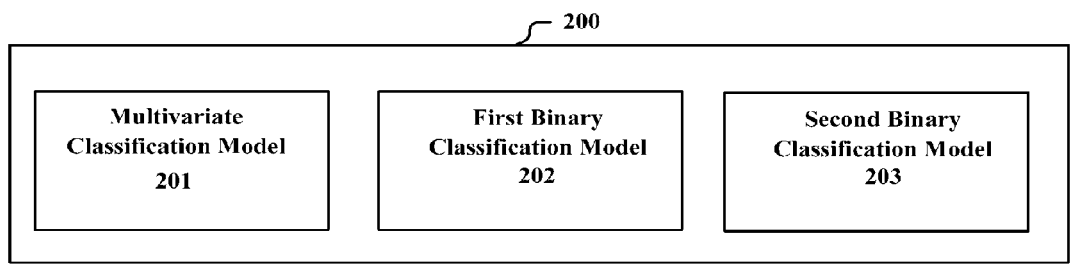
FIG. 2 is a structural diagram of an example of the joint model according to an embodiment of the present application.

As shown in FIG. 2, in an example, the joint model 200 can include: a multiple classification model 201, configured to perform classification based on the feature vector of the candidate position of the zero pronoun, to acquire a restoration probability of a zero pronoun category at the candidate position of the zero pronoun; a first binary classification model 202, configured to perform classification with respect to the feature vector of the word pair of the candidate noun and zero pronoun category including each zero pronoun category on each candidate position of zero pronoun, to acquire a resolution probability that there exists the referent relationship between each word pair of zero pronoun category and candidate noun at the candidate position of the zero pronoun; and a second binary classification model 203, configured to perform classification on each triple of candidate position of zero pronoun-zero pronoun category-candidate noun based on the restoration probability and the resolution probability, to acquire a result of restoration and resolution.

Wherein, the practical use, the setting of each feature vector and the extracting manner are the same as those in the above mentioned training procedure, and will not be repeated here.

In an example, the result of restoration and resolution includes a result label and a corresponding confidence level, and the classifier 102 is configured to select the triple of candidate position of zero pronoun-zero pronouns category-candidate noun the label of which is positive and confidence level is the highest, take the zero pronoun category at the position of zero pronoun in this triple as the zero pronoun in the text, and take the candidate noun in this triple as the noun referred by this zero pronoun.

Figures 3, 4:
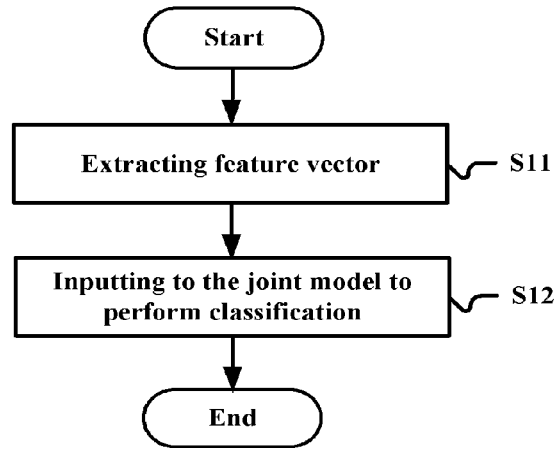
FIG. 3 is a diagram of the performance comparison of the method based on the joint model according to the embodiment of the present application and the traditional method.
FIG. 4 is a flowchart of the method for resolving zero anaphora in Chinese language according to an embodiment of the present application.

FIG. 3 shows the performance comparison of the zero anaphora resolution obtained by using the above mentioned joint model and by using traditional pipeline manner. Wherein, the precision (P) means the percentage of the correct relationship instances recognized by the system to all the relationship instances recognized by the system, the recall ratio (R) means the percentage of the correct relationship instances recognized by the system to all the correct relationship instances, and F1 score is consistent average value of the precision and the recall ratio, and is defined as $$F1 = \frac{2 * R * P}{R + P}.$$

It can be seen that, the method based on the joint model according to the present invention can obtain better performance, and the F1 score is increased obviously.

It is apparent that some processing or methods are also disclosed in the description above on the apparatus for resolving zero anaphora in Chinese language according to embodiments of the present invention. Below, the summary of the methods is described without repeating the details which are already discussed above, however, it should be noted that although disclosed in the description of the apparatus for resolving zero anaphora in Chinese language, the methods do not certainly employ or are not certainly executed by the aforementioned components. For instance, embodiments of the apparatus for resolving zero anaphora in Chinese language may be partially or completely achieved by hardware and/or firmware, and the method for resolving zero anaphora in Chinese language described below may be fully achieved by a computer-executable program, although the methods may employ the hardware and/or firmware of the apparatus for resolving zero anaphora in Chinese language.

As shown in FIG. 4, the method for resolving zero anaphora in Chinese language according to an embodiment of the present application includes the following steps: extracting, from an input text, feature vectors which are respectively based on candidate positions of zero pronouns, and a word pair of candidate zero pronoun category and candidate noun for each candidate position of the zero pronouns (S11); and inputting the feature vectors into a joint model to perform classifying, so as to determine the zero pronouns in the text (S12).

Figure 5:
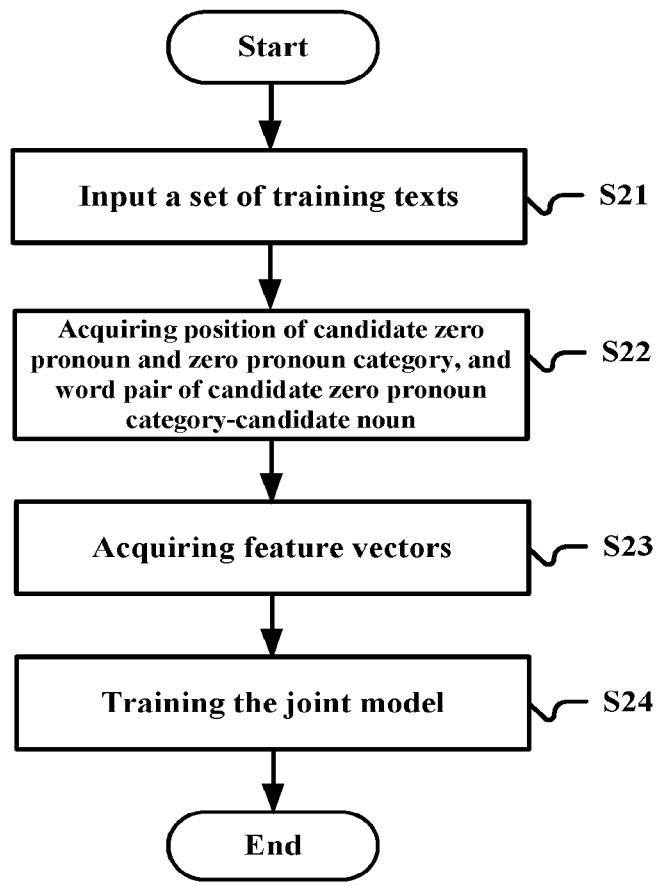
FIG. 5 is a flowchart of the method for training a joint model for resolving zero anaphora in Chinese language according to an embodiment of the present application.

As shown in FIG. 5, the method for training a joint model for resolving zero anaphora in Chinese language according to an embodiment of the present application includes: inputting a set of training texts which are labeled with information of zero pronouns and referent of the zero pronouns (S21); acquiring in each text in the set of training texts, based on the labeling, candidate positions of zero pronouns, zero pronoun categories, as well as word pairs of candidate zero pronoun category and candidate noun (S22); acquiring feature vectors of the candidate positions of the zero pronouns, and feature vectors of the word pairs of candidate zero pronoun category and candidate noun (S23); and training the joint model based on the feature vectors and the labeled information (S24).

It is to be noted that, the details of the above mentioned method have been described in detail in the procedure of describing the apparatus 100 and will not be repeated here.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 600 shown in FIG. 6) from a storage medium or network, wherein the computer is capable of implementing various functions when installed with various programs.

Figure 6:
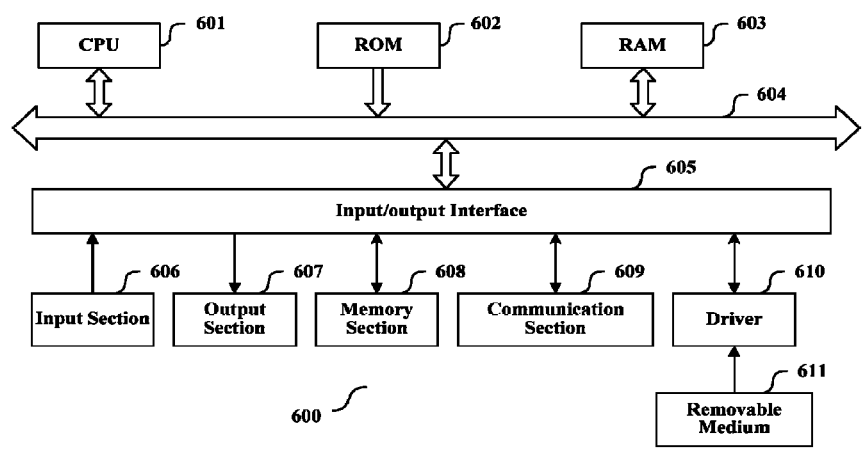
FIG. 6 is an exemplary block diagram illustrating the structure of a general purpose personal computer capable of realizing the method and/or apparatus and/or system according to the embodiments of the present invention.

In FIG. 6, a central processing unit (CPU) 601 executes various processing according to a program stored in a read-only memory (ROM) 602 or a program loaded to a random access memory (RAM) 603 from a memory section 608. The data needed for the various processing of the CPU 601 may be stored in the RAM 603 as needed. The CPU 601, the ROM 602 and the RAM 603 are linked with each other via a bus 604. An input/output interface 605 is also linked to the bus 604.

The following components are linked to the input/output interface 605: an input section 606 (including keyboard, mouse and the like), an output section 607 (including displays such as a cathode ray tube (CRT), a liquid crystal display (LCD), a loudspeaker and the like), a memory section 608 (including hard disc and the like), and a communication section 609 (including a network interface card such as a LAN card, modem and the like). The communication section 609 performs communication processing via a network such as the Internet. A driver 610 may also be linked to the input/output interface 605, if needed. If needed, a removable medium 611, for example, a magnetic disc, an optical disc, a magnetic optical disc, a semiconductor memory and the like, may be installed in the driver 610, so that the computer program read therefrom is installed in the memory section 608 as appropriate.

In the case where the foregoing series of processing is achieved through software, programs forming the software are installed from a network such as the Internet or a memory medium such as the removable medium 611.

It should be appreciated by those skilled in the art that the memory medium is not limited to the removable medium 611 shown in FIG. 6, which has program stored therein and is distributed separately from the apparatus so as to provide the programs to users. The removable medium 611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 602 and the memory section 608 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for resolving zero anaphora in Chinese language, comprising:
   circuitry
   configured to extract, from input text, feature vectors which are respectively based on candidate positions of zero pronouns, and a word pair of candidate zero pronoun category and candidate noun for each candidate position of the zero pronouns; and
   configured to input the feature vectors into a joint model to determine the zero pronouns in the text, the joint model including a first binary classification model configured to perform classification with respect to the feature vector of the word pair of the candidate noun and the zero pronoun category including each zero pronoun category at each candidate position of zero pronoun, to acquire a first resolution probability that there exists a referent relationship between each word pair of zero pronoun category and candidate noun at the candidate position of the zero pronoun.

2. The apparatus according to claim 1, wherein, the joint model further includes
   a multivariate classification model, configured to perform classification based on the feature vector of the candidate position of zero pronoun, to acquire a second restoration probability of a zero pronoun category on the candidate position of zero pronoun; and
   a second binary classification model, configured to perform classification on each triple of candidate position of zero pronoun-zero pronoun category-candidate noun based on the first restoration probability and the second resolution probability, to acquire a result of restoration and resolution.

3. The apparatus according to claim 2, wherein, the result of restoration and resolution includes a result label and a corresponding confidence level, and the circuitry is configured to select the triple of candidate position of zero pronoun-zero pronouns category-candidate noun the label of which is positive and the confidence level is the highest, take the zero pronoun category at the zero pronoun position in this triple as the zero pronoun in the text, and take the candidate noun in this triple as the noun referred by this zero pronoun.

4. The apparatus according to claim 2, wherein, the multiple classification model and the first binary classification model are the maximum entropy models.

5. The apparatus according to claim 2, wherein, the second binary classification model is a supported vector machine model.

6. The apparatus according to claim 1, wherein, the joint model is acquired by training based on a set of training texts in advance.

7. The apparatus according to claim 1, wherein, the feature vector based on the candidate position of zero pronoun includes at least one of the following features:
syntactic features of a current word corresponding to the candidate position of zero pronoun, syntactic features of a parent node of the current word in a dependency tree, syntactic features of a word preceding the current word, a distance between the current word and its parent node in the dependency tree, a number of verbs, not including the current word and its parent node, in a dependency sub-tree between the current word and its parent node in the dependency tree, a number of commas, not including the current word and its parent node, in a dependency sub-tree between the current word and its parent node in the dependency tree, feature of part of speech of a verb of a parent node of the current word in the dependency tree, a combination of part of speech of the current word and a dependency arc label of the current word with its parent node as well as the part of speech of the parent node of the current word and a dependency arc label of the parent node of the current word with a higher parent node, a combination of the part of speech of the current word and a path from the current word to a root node of the dependency tree.

8. The apparatus according to claim 1, wherein, the feature vector based on the word pair of zero pronoun category and candidate noun includes at least one of the following features:
syntactic features of a noun, syntactic features of a zero pronoun, part of speech of the noun and a dependency arc label of the noun with its parent node as well as part of speech of the parent node of the noun and a dependency arc label of the parent node of the noun with a higher parent node, part of speech of the noun and a path from the noun to a root node of the dependency tree, part of speech of the zero pronoun and a dependency arc label of the zero pronoun with its parent node as well as part of speech of the parent node of the zero pronoun and a dependency arc label of the parent node of the zero pronoun with a higher parent node, part of speech of the zero pronoun and a path from the zero pronoun to a root node of the dependency tree, a bi-gram probability of the noun and a word after the zero pronoun obtained by statistics on large scale texts.

9. A method for resolving zero anaphora in Chinese language, comprising:
extracting, from input text via processing circuitry, feature vectors which are respectively based on candidate positions of zero pronouns, and a word pair of candidate zero pronoun category and candidate noun for each candidate position of zero pronouns; and
inputting, via the processing circuitry, the feature vectors into a joint model to perform classifying, so as to determine the zero pronouns in the text, the joint model including a first binary classification model configured to perform classification with respect to the feature vector of the word pair of the candidate noun and the zero pronoun category including each zero pronoun category at each candidate position of zero pronoun, to acquire a first resolution probability that there exists a referent relationship between each word pair of zero pronoun category and candidate noun at the candidate position of the zero pronoun.

10. A method for training a joint model for resolving zero anaphora in Chinese language, comprising:
inputting, via processing circuitry, a set of training texts which are labeled with information of zero pronouns and referent of the zero pronouns;
acquiring, via the processing circuitry, in each text in the set of training texts, based on the labeling, candidate positions of zero pronouns, zero pronoun categories, as well as word pairs of candidate zero pronoun category and candidate noun;
acquiring, via the processing circuitry, feature vectors of the candidate positions of zero pronouns, and feature vectors of the word pairs of candidate zero pronoun category and candidate noun; and
training, via the processing circuitry, the joint model based on the feature vectors and the labeled information, the joint model including a first binary classification model configured to perform classification with respect to the feature vector of the word pair of the candidate noun and the zero pronoun category including each zero pronoun category at each candidate position of zero pronoun, to acquire a first resolution probability that there exists a referent relationship between each word pair of zero pronoun catenory and candidate noun at the candidate position of the zero pronoun.

* * * * *